United States Patent [19]

Nightingale et al.

[11] Patent Number: 5,052,815
[45] Date of Patent: Oct. 1, 1991

[54] SINGLE FREQUENCY RING LASER WITH TWO REFLECTING SURFACES

[75] Inventors: John L. Nightingale, Portola Valley; John K. Johnson, Mountain View, both of Calif.

[73] Assignee: Coherent, Inc., Palo Alto, Calif.

[21] Appl. No.: 509,627

[22] Filed: Apr. 13, 1990

[51] Int. Cl.$^5$ .............................................. H01S 3/083
[52] U.S. Cl. ...................................... 372/94; 372/19; 372/21; 372/66; 372/100
[58] Field of Search ................... 372/94, 93, 100, 101, 372/21, 22, 106, 37, 66, 19; 356/350

[56] References Cited

U.S. PATENT DOCUMENTS

| | | | |
|---|---|---|---|
| 3,200,342 | 8/1965 | Kibler | 330/4.5 |
| 3,414,839 | 12/1968 | Bridges et al. | 372/94 |
| 4,507,785 | 3/1985 | Richards | 372/12 |
| 4,525,843 | 6/1985 | Diels | 372/94 |
| 4,578,793 | 3/1986 | Kane et al. | 372/94 |
| 4,653,056 | 3/1987 | Baer et al. | 372/27 |
| 4,656,635 | 4/1987 | Baer et al. | 372/27 |
| 4,739,507 | 4/1988 | Byer et al. | 372/22 |
| 4,747,111 | 5/1988 | Trutna, Jr. et al. | 372/94 |
| 4,797,896 | 1/1989 | Kane | 372/94 |
| 4,827,480 | 5/1989 | Kowalski | 372/28 |
| 4,933,947 | 6/1990 | Anthon et al. | 372/34 |

OTHER PUBLICATIONS

Optics Communications, vol. 73, No. 6, Nov. 15, 1989, Single-Frequency Q-Switched Operation of a Laser Diode-Pumped, Nd: YAG Ring Laser, Clarkson and Hanna.
Abstract of a Talk Given Apr. 28, 1989, Diode Pumped Q-Switched Single Frequency ND:YAG Ring Laser, Clarkson et al.
Technology Information Sheet Dated Oct. 30, 1989 from Defense Technology Enterprises Limited.
Large-Amplitude Fluctuations Due to Longitudinal Mode Coupling in Diode-Pumped Intracavity-Doubled Nd:YAG Lasers, T. Baer, Journal Optical Society, vol. 3, No. 9, Sep. 1986.

Primary Examiner—William L. Sikes
Assistant Examiner—Galen J. Hansen
Attorney, Agent, or Firm—Limbach, Limbach & Sutton

[57] ABSTRACT

A ring laser is provided with only two reflecting surfaces to define the cavity. A gain medium is located between the reflecting surfaces. At least one optical interface is located within the cavity and is oriented such that the beam will be deflected by refraction to create a ring path. The angle of incidence of the beam with the interface should be less than Brewster's angle and the surface should have an antireflective coating. The interface can be located on the lasant material, on a non-linear optical material or on a passive optical element. Preferably, the device is arranged to achieve unidirectional and single frequency operation. When the ring is used for intracavity second harmonic generation, the resultant output is amplitude stable because of the avoidance of mode beating. The second harmonic radiation is generated unidirectionally increasing useable output.

20 Claims, 2 Drawing Sheets

SINGLE FREQUENCY RING LASER WITH TWO REFLECTING SURFACES

TECHNICAL FIELD

The subject invention relates to a single frequency ring laser with a minimum of reflecting surfaces. The laser is particularly suited for efficient intra-cavity frequency doubling and can generate a stable second harmonic output.

BACKGROUND

A variety of ring laser systems have been developed in the prior art. In a ring laser, a plurality of reflecting surfaces are provided for guiding the laser light about a closed loop. The laser light in a ring laser takes the form of a travelling wave. This situation can be compared with the more common linear laser cavity where the light energy bounces back and forth between two mirrors defining the cavity. The light in a linear cavity forms a standing wave.

One primary advantage of a ring laser is that travelling wave operation can yield single frequency performance. Single frequency performance is desirable when a non-linear crystal is placed in the laser cavity for generating second harmonic radiation. Attempts to generate second harmonic radiation using a linear cavity have typically resulted in significant amplitude fluctuations due to longitudinal mode coupling. (See, "Large-amplitude Fluctuations Due to Longitudinal Mode Coupling in Diode-pumped Intracavity-doubled Nd:YAG, " T. Baer, J. Opt. Soc., Vol. 3, No. 9, 1986) Ring lasers, which generate single frequency output avoid mode beating, allowing for a more stable frequency doubled output.

As will be discussed below, single frequency performance is possible when a means is provided to insure that the light travels in only one direction in the ring. If such a means is not provided, two counterpropagating beams will travel in the ring adversely affecting performance.

One of the principle drawbacks to ring lasers is that they can be difficult to align and operate. As noted above, a ring laser will have a number of reflecting faces, each of which must be properly aligned for effective operation. In addition, the increased number of optical components necessary to define the ring will increase losses.

One approach for minimizing the problems associated with prior art ring lasers is to use a monolithic ring structure. In a monolithic structure, a single block of lasant material is formed with integral reflecting surfaces. As can be appreciated, no adjustments are necessary in a monolithic structure. Also, losses are minimized.

One example of a monolithic ring laser is disclosed in U.S. Pat. No. 4,578,793, issued Mar. 25, 1986 to Kane et al., the disclosure of which is incorporated herein by reference. The monolithic structure disclosed in the patent has three facets that totally internally reflect the laser beam. A fourth face acts as both the input and output coupler. The light travels within the monolithic structure along a non-planar ring path.

The device described in the latter patent also includes a means to insure that the light travels unidirectionally. This means includes providing a magnetic field about the lasant material to generate a nonreciprocal polarization rotation based on the Faraday effect. By nonreciprocal polarization rotation it is meant that the direction of rotation of the polarization induced by the magnetic field is independent of the direction in which the light is travelling.

In order to obtain unidirectional operation, the ring must also include a means for generating a reciprocal polarization rotation. By reciprocal polarization rotation it is meant that the direction of rotation will be dependant upon the direction which the light is travelling. More specifically, polarization will be rotated in one direction when the light is travelling one direction in the ring and when the light is travelling in the other direction, the rotation will be exactly reversed.

Reciprocal polarization rotation can be achieved in a non-monolithic ring by using a conventional optically active rotator, a birefringent element or a non-planar ring geometry. In the Kane device, the non-planar geometry of the reflecting facets are arranged to create the necessary reciprocal polarization rotation effect. By providing both reciprocal polarization rotation and nonreciprocal polarization rotation, the light energy travelling in opposite directions in the ring will have different polarization orientations.

The third and final element necessary to obtain unidirectional operation is a means for providing polarization discrimination. In a standard ring, polarization discrimination can be created with an optical element inclined at Brewster's angle. In the monolithic Kane device, the light incident on the output coupler face is inclined at an oblique angle and the output coupler face is optically coated to provide polarization discrimination. By providing polarization discrimination, light having one polarization orientation (and direction of travel about the ring) will have higher losses than light in the counterpropagating beam and therefore lasing will be suppressed. In this manner, unidirectional operation is achieved which is necessary for single frequency operation. As will be discussed below, the ring laser of the subject invention preferably includes an equivalent means for inducing unidirectional operation.

While devices designed in accordance with the Kane patent are useful, they have certain drawbacks. For example, efficient intracavity frequency doubling cannot presently be achieved in a monolithic structure. Generation of the second harmonic is typically limited to the use of frequency doublers located outside of the resonant cavity where power is lower and doubling efficiency is greatly reduced.

Very recently, there has been some work performed in developing ring laser geometries which would be easier to align and allow intracavity frequency doubling and Q-switching. This work is described in "Single Frequency Q-Switched Operation of a Laser Diode-Pumped, Nd:YAG Ring Laser," Clarkson and Hanna, Optics Communications, Vol. 73, No. 6, Nov. 15, 1989. The laser described therein has a minimum of elements so that alignment is relatively straightforward.

FIG. 1 illustrates the ring laser 10 described in the Clarkson paper. The laser consists of a Nd:YAG laser rod 12 having an end face 14 coated for high reflectivity at the laser wavelength and high transmission at the pump wavelength. The rod is pumped by a beam from a diode laser (not shown). The other end of the cavity is defined by a concave output coupler 16. A rhombic prism 20 is located between the rod and the output coupler.

In the Clarkson device, the geometry of the prism 20 serves to define the geometry of the ring. More specifically, the angles of the prism are chosen so that the laser beam is deflected by refraction into a ring path. The faces of the prism are chosen to be at Brewster's angle to minimize losses and act as a polarizer. In the illustrated embodiment, the prism is formed from lithium niobate and can be used to Q-switch the laser by application of the appropriate voltage which causes the prism to act as a Pockels cell.

Unidirectional and single frequency operation is achieved in a manner analogous to that described above. More specifically, nonreciprocal polarization rotation is induced through the presence of a magnetic field generated by permanent magnets 22. Reciprocal polarization rotation can be induced from the birefringence of the lithium niobate prism or by placing a slight wedge on the face of the rod creating a non-planar ring geometry as described in the Kane patent. The polarization rotations combined with the losses induced from the Brewster faces of the prism will create a differential loss between the counterpropagating beams and will thus induce unidirectional operation.

As can be appreciated, the device shown in FIG. 1 has less reflecting elements than in prior art ring laser structures. The device also allows for the insertion of intracavity elements not possible with the monolithic device disclosed by Kane. However, the device in FIG. 1 does have drawbacks. For example, the ring geometry is achieved using a separate additional optical element (i.e. the prism 20.) It would be desirable to create a ring geometry with even fewer components.

Another drawback to the geometry of FIG. 1 is that the beam must pass through the prism media twice, thereby increasing the loss in the system.

A further drawback of the Clarkson approach arises if this geometry were to be used in a frequency doubling scheme wherein the rhombic prism was formed from a non-linear optical material. For example, while the Brewster angle faces of the prism serve to minimize optical losses by reflection for uncoated optical elements, they will impart asymmetries to the beam within the prism which in turn adversely affect the ability to focus the beam. The ability to tightly focus the beam is required to maximize doubling efficiency.

Other drawbacks would be encountered depending upon the non-linear material selected. For example, a Type II phasematching material such as KTP exhibits double refraction wherein the two polarization states of the resonated fundamental beam will be refracted at different angles. The angular separation between the two refracted beams typically increases as the angle of incidence is increased. Thus, the requirement of a Brewster's angle of incidence would create severe double refraction leading to high intracavity losses. Moreover, the double refraction problem would be compounded in the Clarkson scheme since the beam must pass through the crystal a second time on the return path.

The Clarkson geometry is also undesirable for uniaxial, non-critical Type I phasematching materials such as lithium niobate. In these types of crystals, the phasematching conditions will be satisfied for both beam paths through the prism. This will result in the second harmonic wave being generated in both beam direction passes through the prism, thereby reducing the efficiency of the second harmonic output. Accordingly, it would be desirable to pro    a new ring laser design that overcame the difficulties described above with respect to the approach shown in FIG. 1.

Therefore it is an object of the subject invention to provide a new ring laser design which can have fewer optical elements.

It is another object of the subject invention to provide a new ring laser design which allows the beam to be tightly focused within the non-linear crystal.

It is a further object of the subject invention to provide a new ring laser design that has a minimum of refractive interfaces and does not require passing the beam through the refractive optical element more than once.

It is still another object of the subject invention to provide a ring laser design which can be pumped by a laser diode.

It is still a further object of the subject invention to provide a ring laser design having an intracavity non-linear optical material and which g          le ec- ond harmonic output.

SUMMARY OF THE INVENTION

In accordance with these and other objects, the subject invention provides for a new ring laser having a pair of reflecting faces. A gain medium is located between the reflecting faces and preferably is defined by a solid state lasant material. In accordance with a first aspect of the subject invention, at least one face of the lasant material is provided with a geometry which deflects the laser beam by refraction to create the ring path. In this manner, a ring laser configuration can be created with a minimum number of optical components.

In another aspect of the subject invention, the optical interface which creates the ring path can be located on either the lasant material or on another optical element such as a non-linear optical material located in the cavity. However, unlike the geometry discussed above with respect to FIG. 1, the angle of incidence of the laser beam with the optical interface is less than Brewster's angle and is preferably less than 45°. By this arrangement, the design constraints imposed by requiring Brewster's angle interfaces are eliminated allowing for greater flexibility in the ring geometry. In addition, the problems discussed above with respect to configuring a non-linear optical material with Brewster angle interfaces are avoided. Preferably, the interface which deflects the beam is provided with an antireflective coating to minimize losses.

As in the two ring laser designs discussed above, the preferred embodiment of the subject ring laser includes a means for creating unidirectional operation required for single frequency operation. Any of the means discussed above would be suitable. In the illustrated embodiments, a magnetic field is used to create nonreciprocal polarization rotation. A quartz rotator plate oriented at Brewster's angle is used to create reciprocal polarization rotation as well as polarization discrimination. The output of the ring laser can be used to efficiently generate a stable second harmonic output using an intracavity non-linear doubler crystal.

Further objects of the subject invention will become apparent from the following detailed description, taken in conjunction with the following drawings in which:

DETAILED DESCRIPTION OF THE PREFERRED EMBODIMENTS

Figure 1:
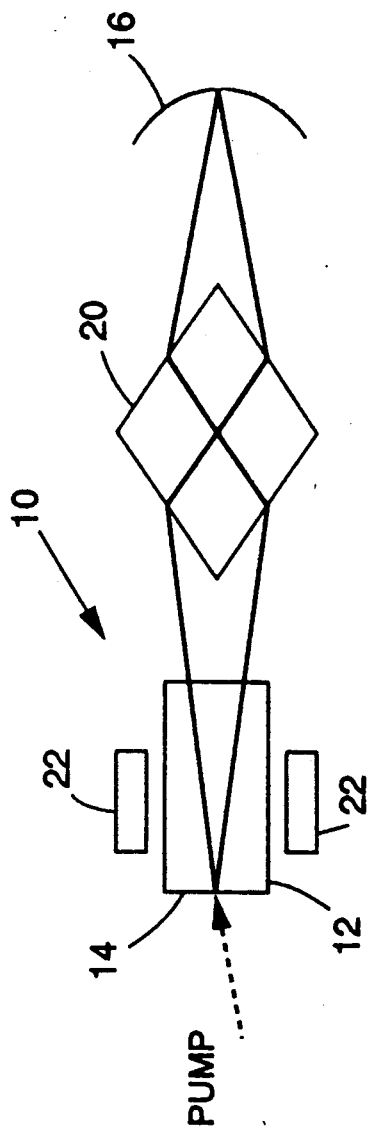
FIG. 1 is a schematic diagram of a ring laser found in the prior art.
Figure 2:
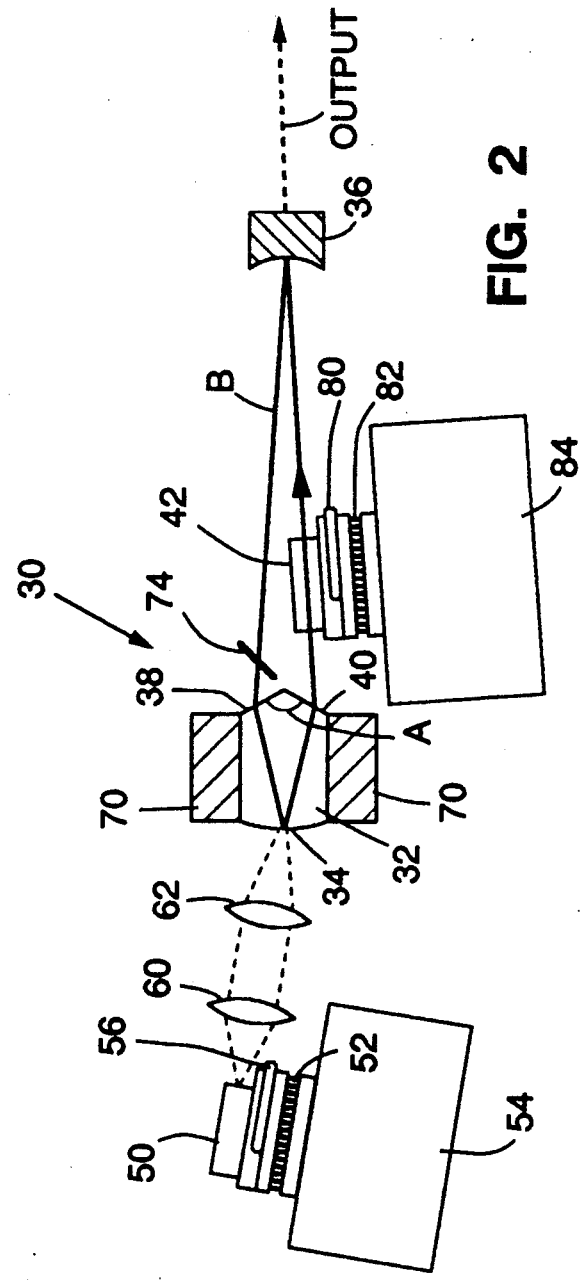
FIG. 2 is a schematic diagram of one embodiment of the ring laser of the subject invention.

Turning to FIG. 2, there is illustrated a schematic diagram of the ring laser 30 of the subject invention. The ring laser includes a block of lasant material 32. The lasant material can be Nd:YAG or similar material such as Nd:Glass. The rear face 34 of the Nd:YAG block is coated to be highly transmissive to the pump wavelength of 808 nm and highly reflective to the lasing wavelength of 1.06 microns. The rear face 34 thus acts as one of the two reflective surfaces forming the laser cavity. If an intracavity non-linear crystal is used, the rear face 34 is curved to create a beam waist in the crystal for efficient doubling. The other end of the cavity is defined by a curved output coupler 36 which is partially transmissive at the output laser wavelength. In the illustrated embodiment, where an intracavity frequency doubler crystal is used, the output coupler is highly reflective at the fundamental wavelength and transmissive at the second harmonic wavelength. Preferably, the length of the cavity does not exceed 10 cm.

In accordance with the subject invention, a means is provided for deflecting the laser beam by refraction to create a ring path. In the illustrated embodiment, the means is defined by a pair of faces 38 and 40 on the lasant material disposed at an angle to bend the beam and create the ring path shown as B in the Figure. As can be appreciated, an extremely simple ring path is achieved using only a block of lasant material and a single additional reflective mirror 36. Accordingly, losses and alignment problems are minimized. In addition, the non-monolithic structure allows for the insertion of optical elements, such as a non-linear optical material 42, to be introduced within the cavity.

In accordance with the subject invention, the angle of incidence of the beam B with the faces 38 and 40 is less than Brewster's angle. (Brewster's angle of Nd:YAG at 1.06 microns is 61°). Preferably, the incidence angle is less than 45° and in the illustrated embodiment is on the order of 30°. In order to minimize losses, the faces 38 and 40 are provided with an antireflection coating. For angles of incidence that are 30° or less, a standard normal incidence antireflection coating is suitable. The angle A between faces 38 to 40 is on the order of 120° to 170°.

The lasant material is preferably pumped with a laser diode 50 having an output wavelength of 808 nm. The laser diode 50 is temperature controlled using a conventional thermoelectric cooler 52 attached to a heat sink 54. The temperature is monitored with a thermistor 56. A suitable laser diode, thermistor and cooler are available in a single package from Spectra Diode Laboratories with part No. SDL-2432-H1. A suitable heat sink is also available with part No. SDL-800-C/H.

The output from the laser diode 50 is directed into the lasant material 32 using a collimating lens 60 and a focusing lens 62. In the embodiment shown in FIG. 2, the ring is shown being pumped along the lower branch of the path. The geometry of FIG. 2 would allow a second diode laser (not shown) to be used to pump along the upper branch of the ring.

In the preferred embodiment, a means is provided for creating unidirectional and single frequency operation of the laser. As in the prior art discussed above, a nonreciprocal polarization rotation is obtained through the Faraday effect by creating a magnetic field about the lasant material. The magnetic field is provided by a pair of permanent magnets 70. While the magnets in FIG. 2 are shown on the top and bottom of the lasant material, it is preferable to have them located on either side so that they will be above and below and parallel to the plane of the ring since the typical crystal is usually thinner in this dimension allowing the magnets to be placed closer together. The magnets serve to rotate the polarization of the beam typically about 0.8°.

In the illustrated embodiment, the reciprocal polarization rotation is provided by a 100 micron thick, quartz rotator plate 74. The quartz rotator plate 74 functions to rotate the plane of polarization typically about 0.8°. Polarization and polarization discrimination are achieved by placing the plate 74 at Brewster's angle. The combination of the magnetic field and the plate 74 insures unidirectional operation and allows for the generation of a stable, single frequency output.

As an alternative to the use of the quartz rotator plate 74, reciprocal polarization rotation can be achieved if the faces 38 and 40 are wedged slightly to create a non-planar ring structure as shown in the patent to Kane. As pointed out above, the non-planarity of the ring geometry creates a reciprocal polarization rotation of the beam. If the latter approach is used, polarization discrimination is achieved by a polarization selective coating on at least one of the non-normal incidence refracting interfaces which deflects the beam. As another alternative, the birefringence of a Type I phase-matching non-linear crystal can be used to create the reciprocal polarization rotation similar to the approach described by Clarkson. As an additional alternative, stress induced birefringence in the laser material could serve as the reciprocal polarization rotator. The remaining embodiments are all illustrated using a quartz rotator plate but the non-planar approach or the birefringence of one of the optical elements could be substituted therefore.

A principal advantage of this ring laser over the device described in Kane is that intracavity elements can be used. In the illustrated embodiment, the fundamental wavelength can be frequency doubled using a non-linear optical crystal 42 such as KTP or lithium niobate. The resulting harmonic output will be very stable due to the avoidance of mode beating. Furthermore, useable output is maximized because the second harmonic is generated in a unidirectional manner.

Preferably, the temperature of the crystal 42 is controlled. When KTP is used, a combination of a thermistor 80, thermoelectric cooler 82 and a heat sink 84 is employed. A suitable cooler is available from Marlow Industries as part No. MI1012T-01AC. If lithium niobate is used as the crystal, an oven is necessary to heat the crystal to insure phase matching and obtain maximum conversion efficiency. As noted above, when a non-linear optical crystal is utilized, the output ler 36 is coated to reflect the fundamental wavelength and be transmissive at the second harmonic output wavelength. The non-linear optical crystal should be located at or near the waist of the resonant cavity.

In the alternate embodiments illustrated in FIGS. 3 through 7, like elements will be numbered the same and only the differences will be discussed.

Figure 3:
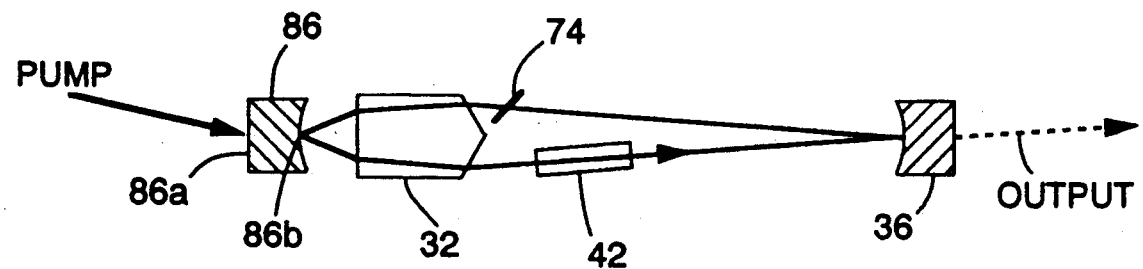
FIG. 3 is a simplified schematic diagram of a second embodiment of the ring laser of the subject invention.

Turning first to FIG. 3, there is illustrated a ring laser wherein the cavity is defined by a pair of separate mirrors 86 and 36. Mirror 86 has a rear face 86a which is transmissive to the pump wavelength of 808 nm. The front face 86b of mirror is coated to be transmissive to the pump wavelength and reflective at the fundamental wavelength. As in the first embodiment, the interfaces for deflecting the beam are located on the lasant material and the angle of incidence of the beam is less than Brewster's angle.

Figure 4:
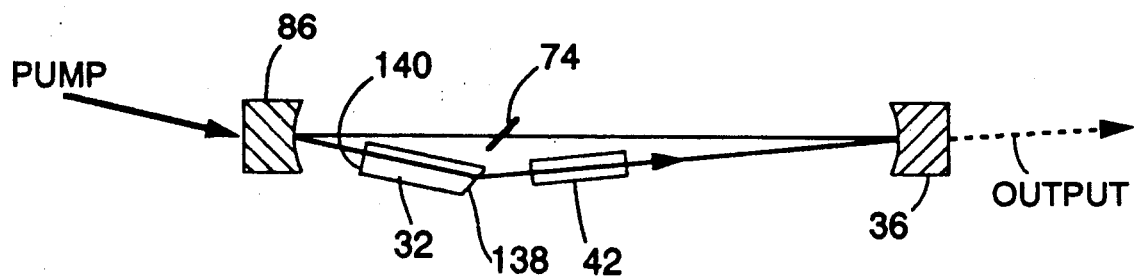
FIG. 4 is a simplified schematic diagram of a third embodiment of the ring laser of the subject invention.

A third alternate embodiment is illustrated in FIG. 4. In this embodiment, the ring geome... ...g a single angled face 138 located on the ...... .. The input face 140 is oriented perpendicular to the input beam. In both the second and third embodiments (FIGS. 3 and 4) a non-linear optical crystal 42 is shown. This element is, of course, not necessary if it is only desirable to generate the fundamental wavelength.

Figure 5:
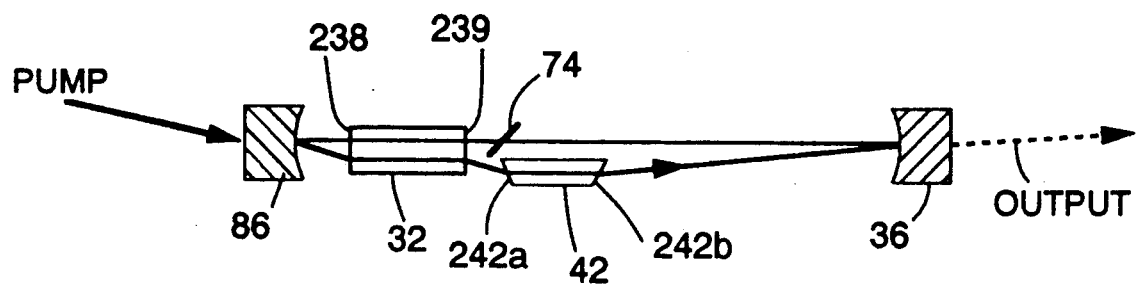
FIG. 5 is a simplified schematic diagram of a fourth embodiment of the ring laser of the subject invention.
Figure 6:
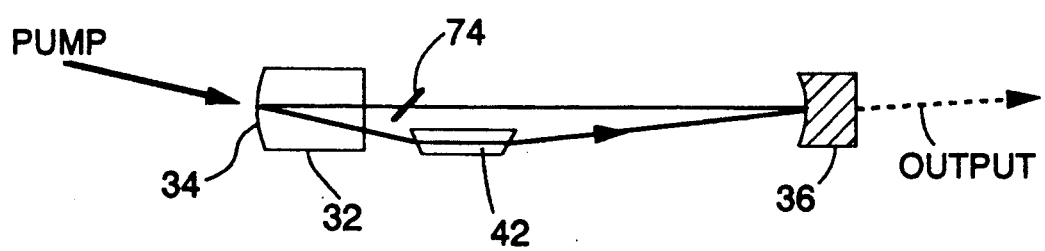
FIG. 6 is a simplified schematic diagram of a fifth embodiment of the ring laser of the subject invention.
Figure 7:
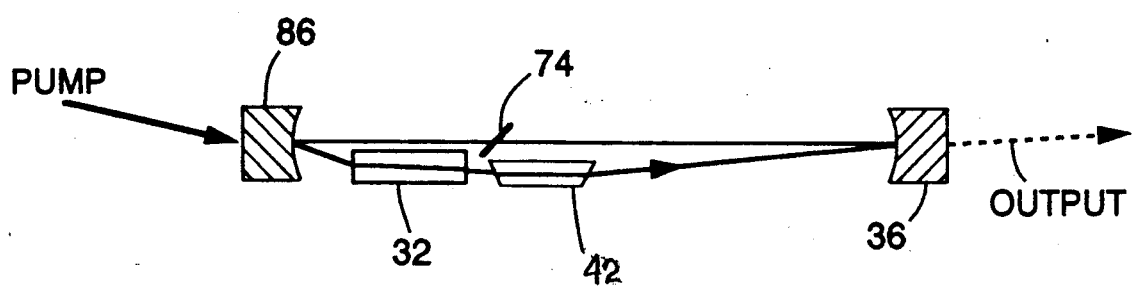
FIG. 7 is a simplified schematic diagram of a sixth embodiment of the ring laser of the subject invention.

FIGS. 5 through 7 are similar to the above discussed embodiments however in each case the deflecting interfaces are located on the non-linear optical crystal 42. In FIG. 5, the front and rear surfaces 238 and 239 of the lasant material are parallel to each other and approximately perpendicular to the circulating beam. The ring geometry is achieved by the orientation of the input and output faces 242a and 242b of the non-linear optical crystal 42. In this embodiment, the cavity is defined by separate mirrors.

FIG. 6 is similar to FIG. 5 except that the rear mirror 34 is formed integrally on the surface of the lasant material as shown in FIG. 2. FIG. 7 is similar to FIG. 5 except that the geometry is arranged such that ring makes only a single pass through the lasant material. This arrangement would be preferred if losses were to be minimized. In contrast, the scheme illustrated in FIG. 5 or 6 would be desirable if one wanted to pump along two directions of the ring.

A ring laser assembled in accordance with the embodiment shown in FIG. 4 was pumped with 300 mW of incident light from a laser diode. When the ring was operated without a non-linear optical material in the cavity, stable single frequency output at 1.06 microns at 95 mW was achieved. When a five mm long KTP crystal was added into the ring, stable single frequency output at 532 nm at 14 mW was achieved.

In summary, there has been disclosed a ring laser design with only two reflecting surfaces to define the cavity. The gain medium is located between the reflecting surfaces. At least one optical interface is located within the cavity and is oriented such that the beam will be deflected by refraction to create a ring path. The angle of incidence of the beam with the interface should be less than Brewster's angle and the surface should have an antireflective coating. The interface can be located on the lasant material or on a non-linear optical material. Preferably, the device is arranged to achieve unidirectional and single frequency operation. When the ring is used for intracavity second harmonic generation, the resultant output is amplitude stable because of the avoidance of mode beating. The second harmonic radiation is generated unidirectionally increasing useable output.

We claim:

1. A ring laser comprising:
   a resonant cavity defined by a pair of reflecting surfaces;
   a block of lasant material located between said reflecting surfaces and;
   a means for pumping said lasant material to generate a laser beam, and with said block of lasant material having at least one face oriented to deflect the path of the laser beam by refraction which in combination with said reflecting surfaces creates a ring path, and wherein said face includes an antireflective coating, and wherein the angle of incidence of the laser beam with said face is less than Brewster's angle.

2. A ring laser as recited in claim 1 wherein one of said reflecting surfaces of said resonant cavity is formed on said lasant material.

3. A ring laser as recited in claim 1 wherein said block of lasant material includes two faces for deflecting the laser beam by refraction.

4. A ring laser as recited in claim 1 further comprising:
   means functioning to produce unidirectional operation of the laser.

5. A ring laser as recited in claim 4 wherein said means for producing unidirectional operation comprises:
   means for generating a nonreciprocal polarization rotation of the laser beam;
   means for generating a reciprocal polarization rotation of the laser beam; and
   means for introducing a differential loss between the two polarization orientations of the laser beam.

6. A ring laser as recited in claim 1 further including a non-linear optical material located at or near the waist of said resonant cavity.

7. A ring laser as recited in claim 1 wherein the angle of incidence of the laser beam with said face is less than 45 degrees.

8. A ring laser as recited in claim 1 wherein said lasant material is optically pumped by light from a laser diode.

9. A ring laser comprising:
   a resonant cavity defined by a pair of reflecting surfaces; and
   a block of lasant material located between said reflecting surfaces and;
   a means for pumping said lasant material to generate a laser beam, and with said block of lasant material having at least one face oriented to deflect the path of the laser beam by refraction which in combination with said reflecting surfaces creates a ring path.

10. A ring laser as recited in claim 9 wherein said face includes an antireflective coating, and wherein the angle of incidence of the laser beam with said face is less than Brewster's angle.

11. A ring laser as recited in claim 9 wherein the angle of incidence of the laser beam with said face is less than 45 degrees.

12. A ring laser as recited in claim 9 wherein one of said reflecting surfaces of said resonant cavity is formed on said lasant material.

13. A ring laser as recited in claim 9 wherein said block of lasant material includes two faces for deflecting the laser beam by refraction.

14. A ring laser as recited in claim 9 further comprising:
   means functioning to produce unidirectional operation of the laser.

15. A ring laser as recited in claim 14 wherein said means for producing unidirectional operation comprises:
   means for generating a nonreciprocal polarization rotation of the laser beam;
   means for generating a reciprocal polarization rotation of the laser beam; and
   means for introducing a differential loss between the two polarization orientations of the laser beam.

16. A ring laser as recited in claim 9 further including a non-linear optical material located at or near the waist of said resonant cavity.

17. A ring laser as recited in claim 9 wherein said lasant material is optically pumped by light from a laser diode.

18. A laser as recited in claim 9 wherein said beam makes only a single pass through said lasant material.

19. A laser as recited in claim 9 wherein said beam is deflected at no more than two faces of said lasant material.

20. A laser as recited in claim 19 wherein said beam is deflected at only one face of said lasant material.

* * * * *